(12) United States Patent
Furui et al.

(10) Patent No.: US 8,109,639 B2
(45) Date of Patent: Feb. 7, 2012

(54) IMAGE PROCESSING DEVICE, PROJECTOR, AND METHOD FOR CORRECTING DISTORTION IN A PROJECTED IMAGE USING VARYING DENSITY PATTERNS

(75) Inventors: Shiki Furui, Matsumoto (JP); Shun Imai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 360 days.

(21) Appl. No.: 12/364,187

(22) Filed: Feb. 2, 2009

(65) Prior Publication Data

US 2009/0207185 A1   Aug. 20, 2009

(30) Foreign Application Priority Data

Feb. 20, 2008   (JP) .................................. 2008-038546

(51) Int. Cl.
  *G03B 21/00*   (2006.01)
(52) U.S. Cl. .......................................... 353/69; 353/70
(58) Field of Classification Search .................... 353/69, 353/70
  See application file for complete search history.

(56) References Cited

U.S. PATENT DOCUMENTS

2005/0206857 A1*   9/2005   Yamada ........................ 353/94

FOREIGN PATENT DOCUMENTS

| JP | A-2001-83949 | 3/2001 |
| JP | A-2004-228619 | 8/2004 |

* cited by examiner

*Primary Examiner* — Thanh X Luu
(74) *Attorney, Agent, or Firm* — Oliff & Berridge, PLC

(57) ABSTRACT

An image processing device adapted to correct distortion of an image projected on a projection screen with projection light emitted from a projector includes a detection section adapted to detect at least one of display positions of a plurality of predetermined figures displayed in a correction image projected by the projector on the projection screen, the plurality of figures arranged at densities varying in accordance with an incident condition of projection light to the projection screen, a distortion correction information generation section adapted to generate distortion correction information based on the display position detected and correction image data representing the correction image, an acquisition section adapted to acquire image data representing the image to be projected on the projection screen, and a distortion correction section adapted to execute a distortion correction process using the distortion correction information on the image data acquired.

10 Claims, 11 Drawing Sheets

IMAGE PROCESSING DEVICE, PROJECTOR, AND METHOD FOR CORRECTING DISTORTION IN A PROJECTED IMAGE USING VARYING DENSITY PATTERNS

BACKGROUND

1. Technical Field

The present invention relates to image processing for a projector, and in particular to a distortion correction technology of an image displayed on a projection screen.

2. Related Art

There are used projectors adapted to project an image on a screen based on image data using an optical system, which is composed of various optical elements such as light valves, digital mirror devices, and a dichroic prism, and illumination light from a light source. Although the screen for the projectors is formed to have a planar shape, the shape is not a perfect plane, but has a slight bulge with a wrinkle or a slack caused by an installation environment, the temperature, the material of the screen, and aged deterioration. In particular in a portable take-up screen, when carrying or retracting the screen, the pipe for retracting the screen is apt to creep to cause the wrinkle and the slack.

It is known that when projecting an image on the screen with the wrinkle or the slack is caused thereon, a distortion is caused in the image by the bulge derived from the wrinkle or the slack. As a technology for eliminating the distortion in the image, there is disclosed a technology of, for example, projecting a pattern image having dot figures, which are arranged in the same intervals in both of the horizontal and vertical directions of the screen, on the screen, and then executing a distortion correction on the image based on the positional difference between the position on the screen where the dot figures are displayed and the position in the original pattern image where the dot figures are displayed, thereby projecting an image without distortion on the screen.

JP-A-2001-083949 and JP-A-2004-228619 are examples of a related art document.

However, the amount of distortion of the image displayed by the projection light entering the same position varies in accordance with the incident conditions such as the incident direction, the incident angle, and so on of the projection light to the screen. Therefore, in the case in which the pattern image with the dot figures arranged at the same intervals is used as in the related art, it is not achievable to detect the variation in the amount of distortion in accordance with the difference in the incident conditions of the projection light with high accuracy, and therefore, there is caused a problem that it is not achievable to correct the distortion of the image projected on the screen with high accuracy. Further, in the case in which the pattern image having dot figures arranged thickly at the same intervals is used, the amount of distortion must be calculated as many times as the number of characteristic points, which increases the processing load of the projector, and incurs increase in the processing time.

SUMMARY

An advantage of some aspects of the invention is to prevent the processing load of the projector from increasing and improve the accuracy of distortion correction of the projection image.

The invention can be realized as the following embodiments or aspects.

An image processing device according to a first aspect of the invention is an image processing device adapted to correct distortion of an image projected on a projection screen with projection light emitted from a projector, including a detection section adapted to detect at least one of display positions of a plurality of predetermined figures displayed in a correction image projected by the projector on the projection screen, the plurality of figures arranged at densities varying in accordance with an incident condition of projection light to the projection screen, a distortion correction information generation section adapted to generate distortion correction information used for distortion correction of an image to be projected on the projection screen, based on the display position detected and correction image data representing the correction image, an acquisition section adapted to acquire image data representing the image to be projected on the projection screen, and a distortion correction section adapted to execute a distortion correction process using the distortion correction information on the image data acquired.

According to this aspect of the invention, since the distortion of the projection image is detected using the correction image data having predetermined figures arranged at densities varying in accordance with the incident condition of the projection light, the distortion amounts varying in accordance with the incident condition can be detected with good accuracy. Therefore, the distortion correction process with high accuracy can be executed on the image data representing the image projected on the projection screen. Therefore, it is possible to generate the image data for displaying an image without distortion on the projection screen. Further, according to the image processing device of this aspect of the invention, since the correction pattern formed to have a lower arrangement density of the predetermined figures in the position where the distortion amount of the projection image is thought to be small in accordance with the incident condition of the projection light, and to have a higher arrangement density of the predetermined figures in the position where the distortion amount of the projection image is thought to be large is used, the increase in the process load of the image processing device due to the increase in the number of the predetermined figures can be suppressed.

In the first aspect of the invention, the plurality of predetermined figures projected on the projection screen is arranged at densities varying in accordance with an incident direction of the projection light to the projection screen. According to this aspect of the invention, the distortion appearing as the projection image in accordance with the difference in the incident direction of the projection light to the projection screen can be detected with high accuracy.

In the first aspect of the invention, the plurality of predetermined figures projected on the projection screen is arranged at densities different between areas obtained by dividing in accordance with the incident direction of the projection light to the projection screen. According to this aspect of the invention, the distortion appearing as the projection image in accordance with the difference in the incident direction of the projection light to the projection screen can be detected with high accuracy.

In the first aspect of the invention, the plurality of predetermined figures projected on the projection screen is arranged at a higher density in a direction substantially perpendicular to the incident direction of the projection light to the projection screen than a density in a direction substantially parallel to the incident direction. According to this aspect of the inventions the distortion in the direction substantially perpendicular to the incident direction can be detected with good accuracy.

In the first aspect of the invention, the plurality of predetermined figures projected on the projection screen is arranged at densities varying in accordance with an incident angle of the projection light to the projection screen. According to this aspect of the invention, the distortion appearing as the projection image in accordance with the difference in the incident angle of the projection light to the projection screen can be detected with high accuracy.

In the first aspect of the invention, the plurality of predetermined figures projected on the projection screen is arranged to have a higher density in accordance with a larger incident angle of the projection light to the projection screen. According to this aspect of the invention, the distortion in the position with a large incident angle of the projection light can be detected with good accuracy.

In the first aspect of the invention, the plurality of predetermined figures projected on a first position on the projection screen where the projection light enters at a first angle is arranged at a first density, and the plurality of predetermined figures projected on a second position on the projection screen where the projection light enters at a second angle larger than the first angle is arranged at a second density higher than the first density. According to this aspect of the invention, the distortion in the position with a large incident angle of the projection light can be detected with good accuracy compared to the position with a small incident angle of the projection light.

In the first aspect of the invention, the predetermined figures in the correction image are arranged at densities varying in accordance with projection distances of the projection light from the projector to the projection screen. According to this aspect of the invention, the distortion appearing as the projection image in accordance with the difference in the projection distance of the projection light can be detected with high accuracy.

In the first aspect of the invention, a shot correction image data acquisition section adapted to acquire shot correction image data representing the projection correction image shot by a shooting section, and a correction image data acquisition section adapted to acquire correction image data representing the correction image are further provided, and the distortion correction information generation section compares the shot image represented by the shot correction image data and the correction image with each other, and generates the distortion correction information based on the difference in the projection positions of the predetermined figures. According to this aspect of the invention, the distortion correction information can automatically be generated using the shot image obtained by shooting the correction pattern image displayed on the projection screen.

In the first aspect of the invention, a storage section adapted to previously store the correction image data corresponding to a configuration of an optical system of the projector is further provided. According to this aspect of the invention, the correction image data suitable for the projector has previously been stored. Therefore, since there is no need for generating the correction image data or acquiring the correction image data from another device, the process load of the projector can be reduced.

A projector according to a second aspect of the invention includes a light source, an image formation section adapted to modulate light emitted from the light source based on image data to form an image represented by the image data, a projection optical system adapted to project light representing the image formed by the image formation section, and the image processing device according to the first aspect of the invention. According to the projector of this aspect of the invention, the image data on which the distortion correction process taking the incident condition of the projection light into consideration is executed can be displayed on the projection screen as the image. Therefore, the image without distortion can be displayed on the projection surface.

The various aspects of the present invention described above can be applied while being combined or partially eliminated according to needs. Further, the present invention can also be configured as a distortion correction method by the image processing device, a computer program for making the image processing device execute the imaging processing, and a recording medium recording the computer program in a computer-readable manner, besides the configuration as the image processing device described above. In any configurations, each of the aspects described above can appropriately be applied. As the computer-readable recording medium, various media such as a flexible disk, a CD-ROM, DVD-ROM, a magneto-optical disk, an IC card, and a hard disk drive can be utilized.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Embodiments

A1. System Configuration

Figure 1:
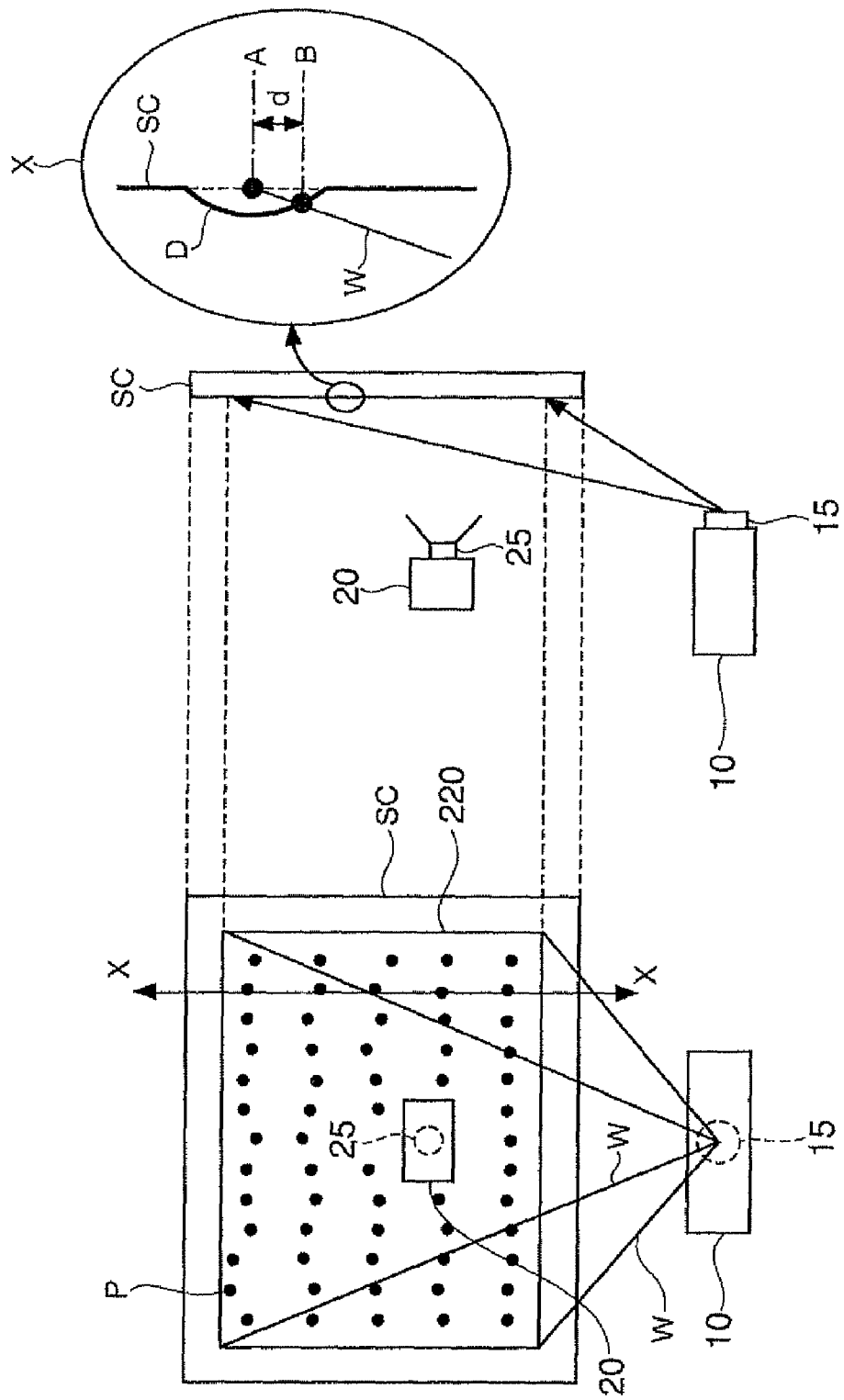
FIG. 1 is an explanatory diagram for exemplifying a configuration of a projector according to a first embodiment.

FIG. 1 is an explanatory diagram for exemplifying a configuration of the projector according to a first embodiment. The mechanism of causing distortion in the projection image by the curved surface distortion of the projection screen SC is also shown in the circle X shown in FIG. 1. In the embodiments described below, "the curved surface distortion of the projection screen SC" represents convex or concave distortion caused on the surface of the projection screen SC due to the wrinkle or the slack of the projection screen SC. The drawing in the circle X shows a part of the cross-sectional surface of the projection screen SC in the vertical direction (the X-X direction shown in FIG. 1).

As shown in FIG. 1, the projector 10 is a short focus projector projecting light for displaying an image on the projection screen SC from a position roughly right under the projection screen SC and relatively distant from the projection screen SC. Hereinafter, in the present embodiment, the light projected from the projector on the projection screen SC is called projection light. The projector 10 executes a distortion correction process on input image data input from another device, and projects the input image data thus corrected on the projection screen SC.

The shooting section 20 is provided with an shooting lens 25 and an imaging element not shown, and takes the image projected on the projection screen SC in accordance with an operation of the user. In the first embodiment, there is taken an image of a projection correction pattern image 220 obtained by projecting a correction pattern image, which is used for correcting the distortion displayed on the projection image due to the curved surface distortion of the projection screen SC, projected on the projection screen SC. It should be noted that when taking an image projected on the projection screen SC, it is preferable that the shooting is executed at a viewpoint position of the viewer, and further, it is preferable that the optical axis of the shooting section 20 and the normal line of the projection screen SC are roughly parallel to each other.

The projection screen SC is an underslung projection screen SC made of white cloth, and is rewound and stored in a cylindrical storage container when retracting.

A mechanism of causing the distortion in the image (hereinafter referred to as a projection image in the first embodiment) projected on the projection screen SC by the projector will be explained. In the circle X shown in FIG. 1, an ideal projection position A represents a position at which the projection light W is projected on the projection screen SC in the condition without distortion D in the projection screen SC, and an actual display position B represents a position at which the projection light W is actually projected on the projection screen SC. There are some cases in which convex or concave distortion on the surface of the projection screen SC is caused by the wrinkle or the slack of the projection screen SC. Such distortion is caused particularly easily in the underslung or take-up projection screen SC.

As shown in the circle X show in FIG. 1, since the projection light W enters the projection screen SC substantially upward from a position below the projection screen SC in the first embodiment, the projection light W is actually projected at the actual display position B located a distance d lower than the ideal projection position A in the case in which the distortion D is caused on the projection screen SC. As described above, in the case in which the projection light W enters the projection screen SC substantially upward, if the projection screen SC is distorted convexly towards the projector, the projection light W is displayed at a lower position than the ideal projection position A. On the other hand, if the projection screen SC is distorted concavely away from the projector 10, the projection light W is displayed at a position the distance d higher than the ideal projection position A. In other words, in the case in which the projection light W enters the projection screen SC upward, the projection image is distorted more significantly in the vertical direction of the projection screen SC compared to the horizontal direction thereof due to the curved surface distortion of the projection screen SC. As a result, the projection image displayed on the projection screen SC is significantly distorted in the vertical direction. It should be noted that the distortion is not only generated in the case in which the projection light W enters the projection screen SC upward, but also caused significantly in a direction along the incident direction of the projection light W.

The projector 10 according to the first embodiment displays a correction pattern image on the projection screen SC, the correction pattern image having a plurality of characteristic points P, each of which is represented by a circular figure, arranged at densities varying in accordance with the incident direction of the projection light, and then corrects the distortion of the projection image based on the display positions of the characteristic points P in the correction pattern image shot by the shooting section 20 (hereinafter referred to as an shot correction pattern image).

A2. Function Blocks

Figure 2:
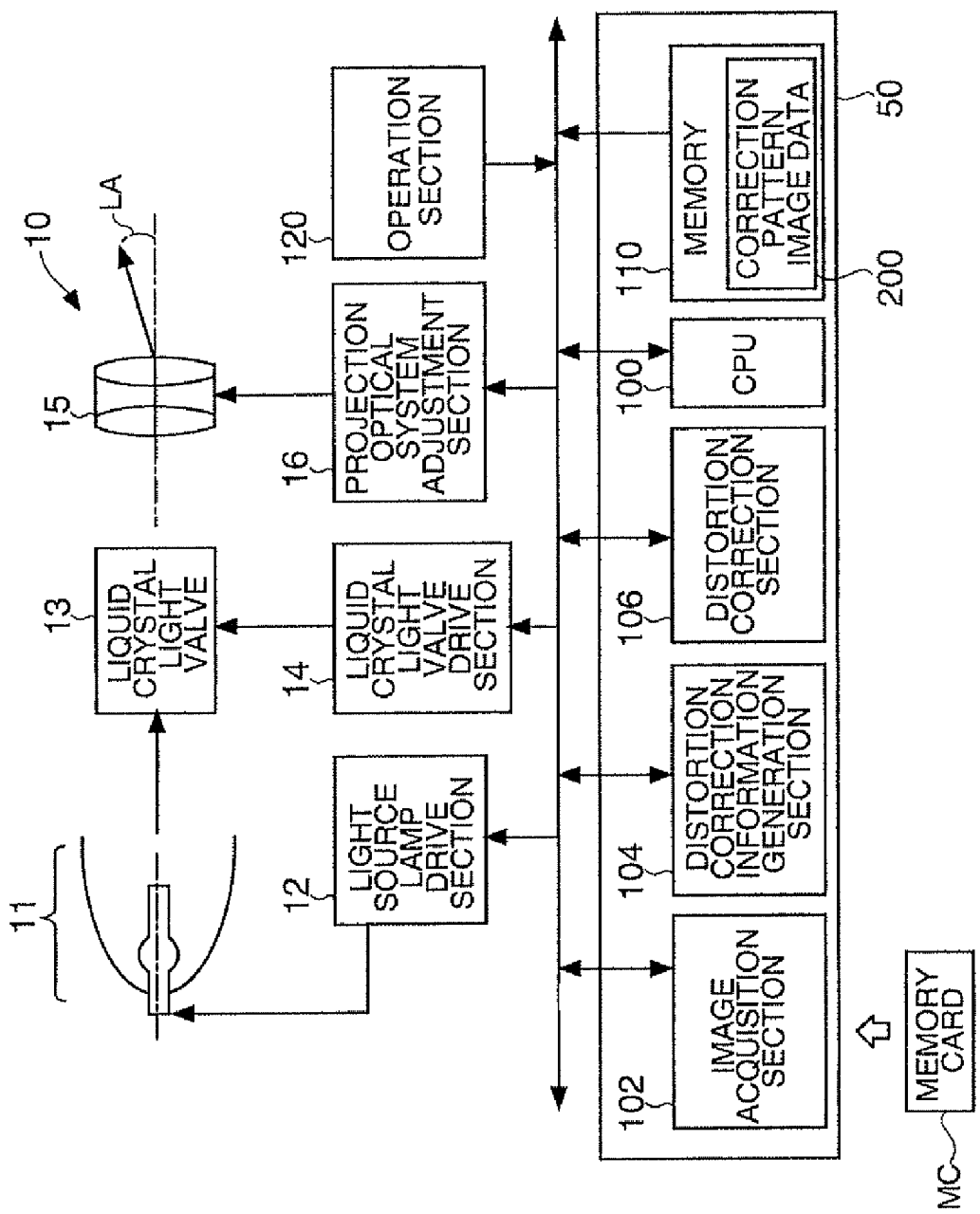
FIG. 2 is a block diagram for exemplifying a configuration of the projector according to the first embodiment.

FIG. 2 is a block diagram for exemplifying a configuration of the projector according to the first embodiment. The projector 10 is provided with a light source lamp 11, a liquid crystal light valve 13, and a projection optical system 15. In FIG. 2, each of the constituents of the optical system is illustrated schematically. Further, the projector 10 is provided with a light source lamp drive section 12, a liquid crystal light valve drive section 14, a projection optical system adjustment section 16, a CPU 100, an image acquisition section 102, a distortion correction information generation section 104, a distortion correction section 106, a memory 110, and an operation section 120. The CPU 100 controls the overall operations of the projector 10. It should be noted that in the first embodiment, the CPU 100, the image acquisition section 102, the distortion correction information generation section 104, the distortion correction section 106, and the memory 110 correspond to "an image processing device" in the appended claims.

The light source lamp drive section 12 drives the light source lamp 11. The liquid crystal light valve drive section 14 drives the liquid crystal light valve 13 in accordance with image data provided from an image processing section 50.

The operation section 120 makes the CPU 100 execute various processing in accordance with the input from the user. For example, it is allowed for the user to change the parameters used in the distortion correction processing of the image, or to adjust the contrast of the image projected on the projection screen SC via the operation section 120.

The projection optical system adjustment section 16 adjusts the position of the projection optical system 15. Specifically, the projection optical system adjustment section 16 moves a lens included in the projection optical system 15 along a direction parallel to the light source optical axis LA, and adjusts a shift position. The light source optical axis represents the center axis of the light emitted from the light source lamp 11. It should be noted that it is possible to eliminate the projection optical system adjustment section, and to arrange that the position of the projection optical system can be adjusted manually.

The image processing section 50 processes the image data input to the projector 10 from the outside using shot correction pattern image data representing the shot correction pattern image taken by the shooting section 20, generates the correction image data from the input image data, and then transfer the correction image data to the liquid crystal light valve drive section 14. In the case in which the curved surface distortion is caused in the projection screen SC, the image processing section 50 executes a distortion correction process on the input image data, the distortion correction process providing distortion in inverted directions of the convex sections and concave sections of the projection screen SC to the image represented by the image data, and displays the image provided with the distortion on the light valve 13, thereby making it possible to display the image without distortion on the projection screen SC. Hereinafter, in the embodiments, the image with distortion to be formed on the liquid crystal light valve 13 is referred to as "a distorted image."

The memory 110 previously stores correction pattern image data 200 representing the correction pattern image used for detecting the curved surface distortion of the projection screen SC. The correction pattern image data 200 has previously been generated in accordance with the design of the optical system of the projector. It should be noted that in the first embodiment, there is used the correction pattern image having the characteristic points arranged so as to have a higher density in a direction substantially perpendicular to the incident direction of the projection light to the projection screen SC.

The image acquisition section 102 has a function of transferring the correction pattern image data or the image data provided from the outside to the distortion correction information generation section 104, and is composed, for example, of an A/D converter. In the first embodiment, the image acquisition section 102 acquires the image data to be projected on the projection screen from a memory card MC.

The distortion correction information generation section 104 generates the distortion correction information used in the distortion correction of the projection image using the shot correction pattern image data representing the shot correction pattern image and the correction pattern image data 200 stored in the memory 110.

The distortion correction section 106 executes the distortion correction process on the input image data transferred from the image acquisition section 102 using the distortion correction information generated by the distortion correction information generation section 104, thus generating the correction image data representing the distortion image from the input image data, and transferring the correction image data to the liquid crystal light valve drive section 14. The distortion correction section 106 is composed, for example, of an image processor.

The liquid crystal light valve drive section 14 drives the liquid crystal light valve 13 using the correction image data transferred from the distortion correction section 106. When the distortion image is formed on the liquid crystal light valve 13 along the correction image data, the image without curved surface distortion is displayed on the projection screen SC. It should be noted that the projection correction pattern image 220 displayed on the projection screen SC has the keystone distortion caused by the tilt of the projector 10 previously corrected by the user.

A3. Correction Pattern Image

Figure 3A:
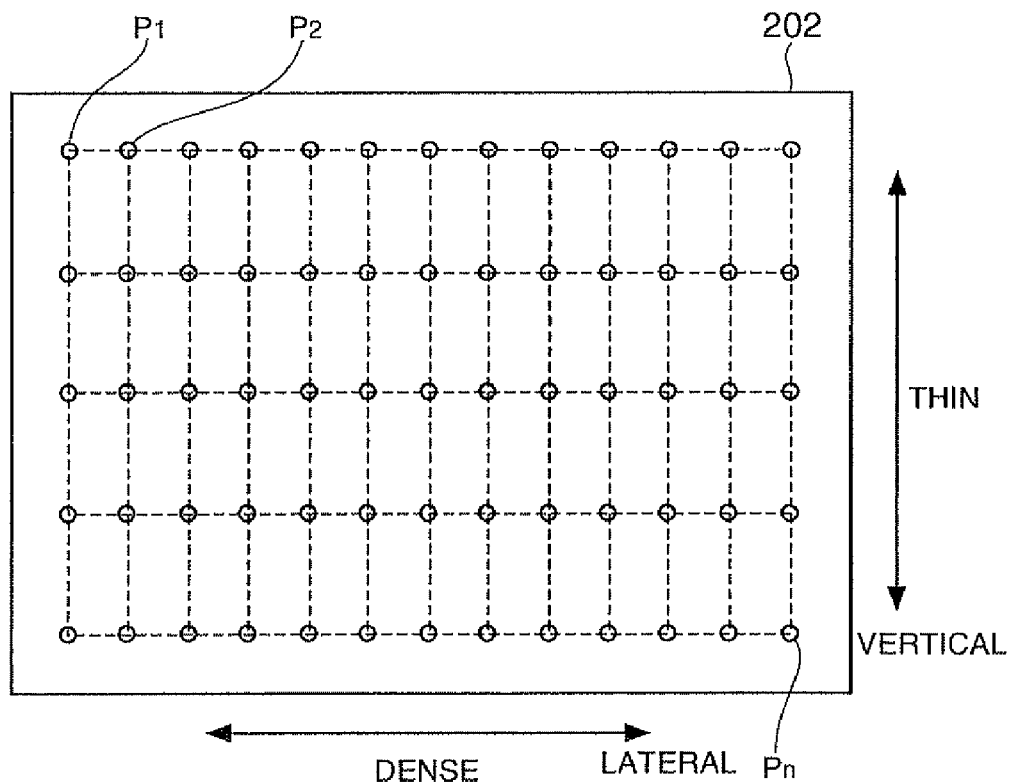
FIGS. 3A and 3B are explanatory diagrams for explaining a correction pattern image in the first embodiment.
Figure 3B:
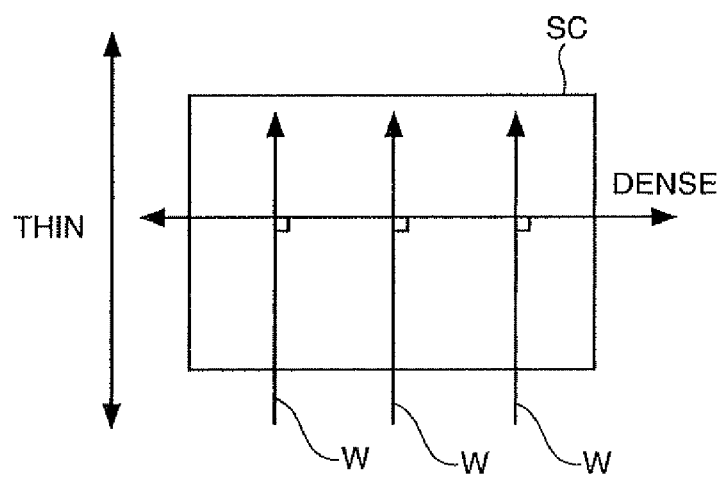

FIGS. 3A and 3B are explanatory diagrams for explaining the correction pattern image in the first embodiment. FIG. 3A shows the correction pattern image 202 represented by the correction pattern image data 200 in the first embodiment, and FIG. 3B shows the relationship between the incident direction of the projection light W to the projection screen SC and the arrangement density of the characteristic points of the correction pattern image 202. The correction pattern image 202 has a plurality of characteristic points $P_1, P_2, \ldots, P_n$ represented with circular figures arranged so that the density of the characteristic points in the lateral direction of the image is higher than that in the vertical direction thereof. Since the projector 10 according to the first embodiment is a short focus projector, and the projection screen SC is relatively small, the projection light W enters the projection screen SC substantially upward as shown in FIG. 3B. Therefore, as explained with reference to FIG. 1, the projection image projected on the projection screen SC by the projector 10 according to the first embodiment is distorted significantly in the vertical direction due to the distortion of the projection screen SC. Therefore, in the first embodiment, as shown in FIG. 3B, by adopting the correction pattern image 202 having the characteristic points $P_1, P_2, \ldots, P_n$ arranged so as to have a higher density in the substantially perpendicular direction (the horizontal direction of the projection screen SC in the first embodiment) with respect to the projection light W entering the projection screen SC upward, the distortion in the vertical direction of the projection image, which is thought to have a large amount of distortion, is detected minutely.

A4. Distortion Correction Processing

Figure 4:
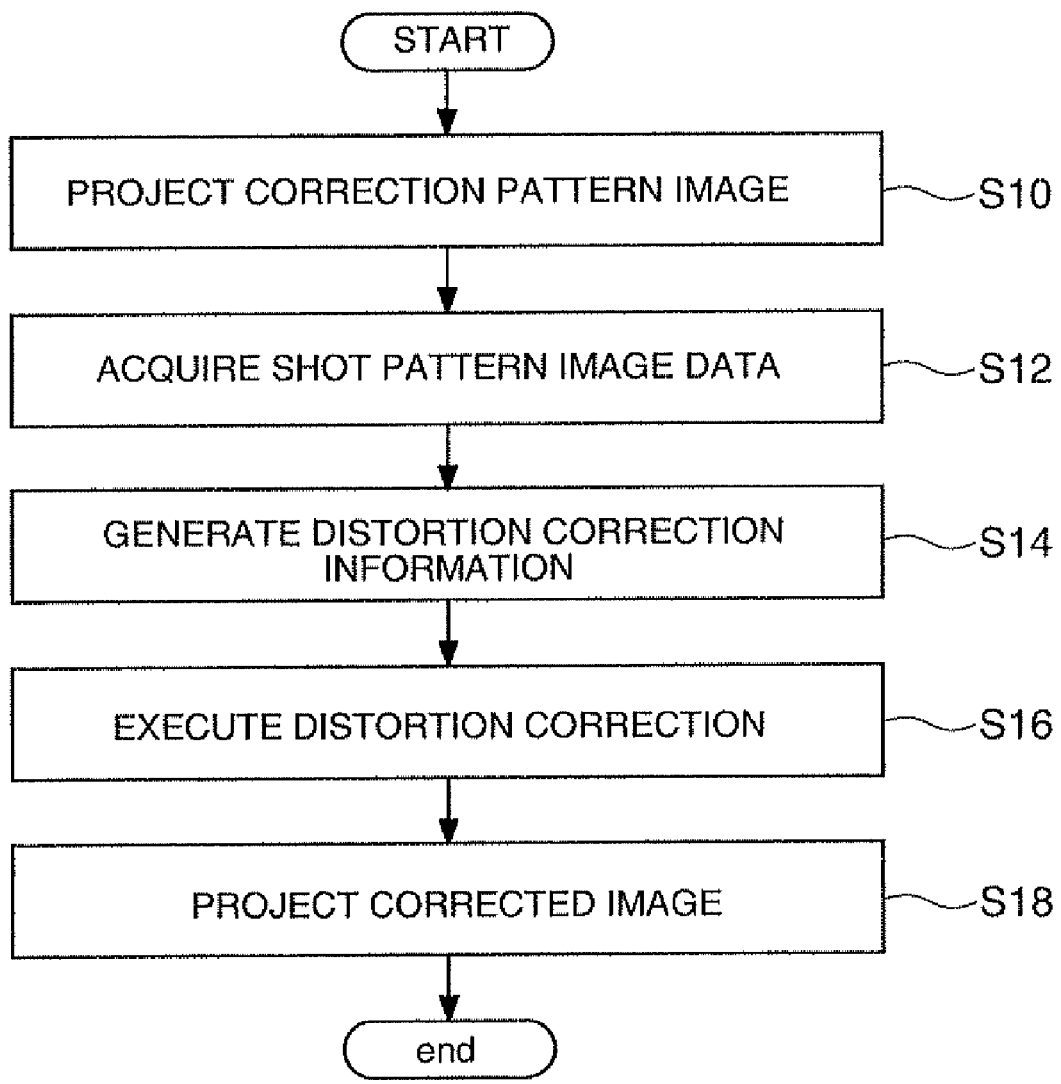
FIG. 4 is a flowchart for explaining a distortion correction process in the first embodiment.
Figure 5A:
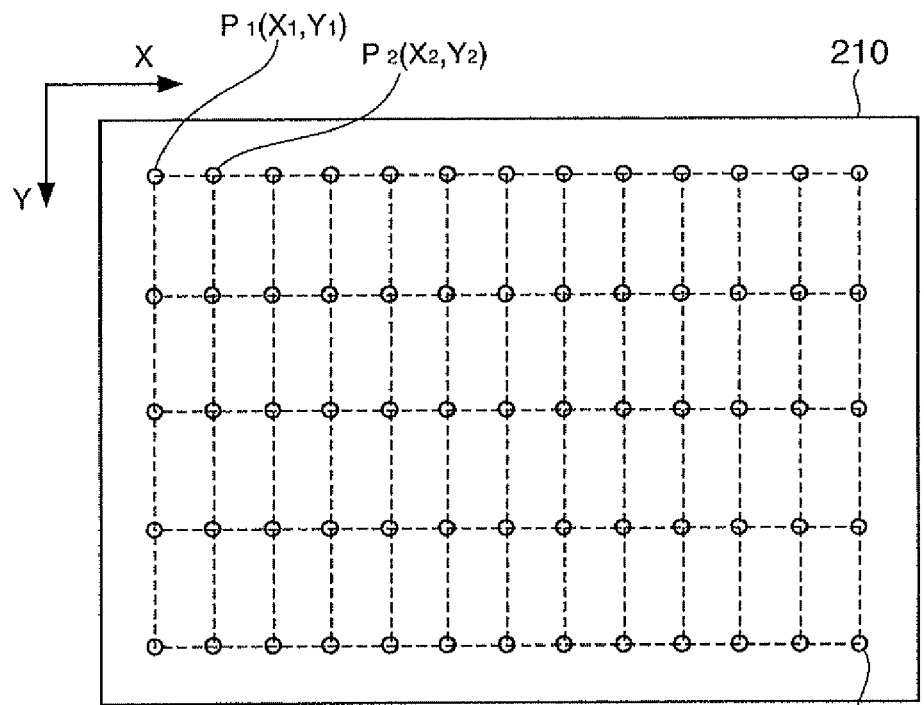
FIGS. 5A and 5B are explanatory diagrams for explaining a distortion correction information generation process in the first embodiment.
Figure 5B:
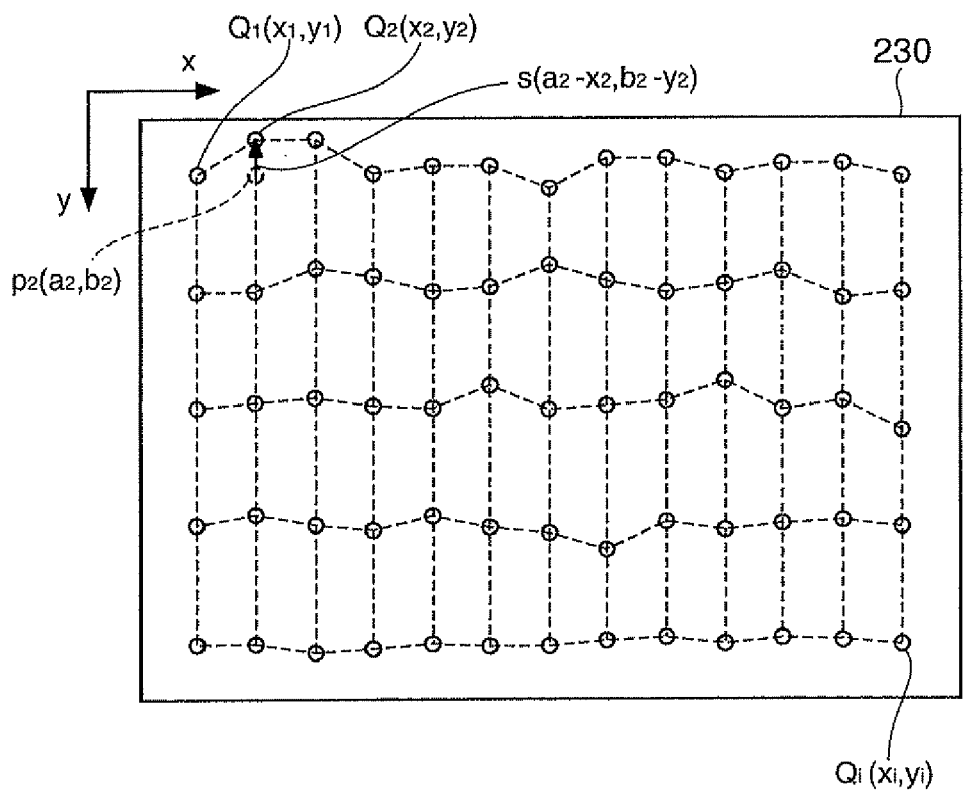
Figure 6A:
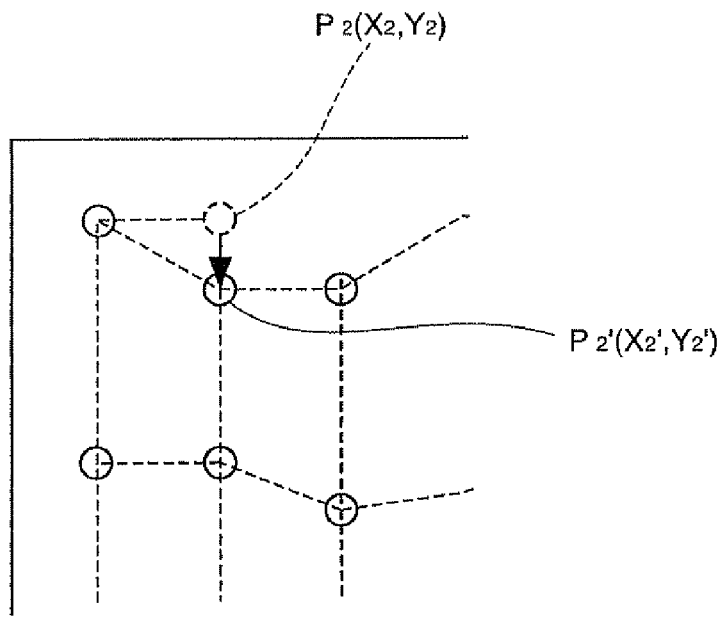
FIGS. 6A and 6B are explanatory diagrams for explaining a distortion correction process in the first embodiment.
Figure 6B:
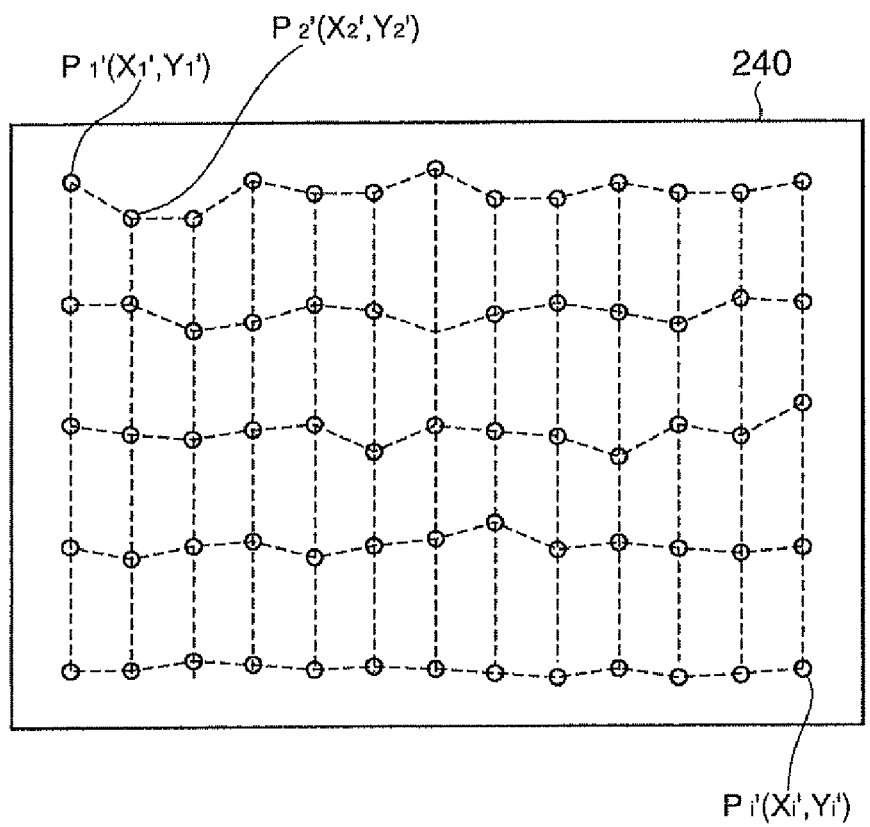

The distortion correction process will be explained with reference to FIGS. 4, 5A, 5B, 6A, and 6B. FIG. 4 is a flowchart for explaining the distortion correction process in the first embodiment. FIGS. 5A and 5B are explanatory diagrams for explaining the distortion correction information generation process in the first embodiment. FIGS. 6A and 6B are explanatory diagrams for explaining the distortion correction process in the first embodiment. The distortion correction process is started in response to input of a starting instruction of the distortion correction process from the user via the operation section 120, and is executed by the CPU 1.00 controlling each of the functional blocks.

The CPU 100 retrieves the correction pattern image data 200 from the memory 110, forms the correction pattern image 210 on the light valve 13, and then projects the correction pattern image 210 on the projection screen SC (step S10). In response to the operation of the user, the shooting section 20 takes the image of the projection correction pattern image 220 projected on the projection screen SC, and generates the shot correction pattern image data.

The CPU 100 acquires the shot correction pattern image data (step S12), and generates the distortion correction information for providing the distortion in the inverted directions of the distortion of the projection image to the input image data (step S14).

The generation of the distortion correction information will be explained with reference to FIGS. 5A, 5B, 6A, and 6B. FIG. 5A shows the correction pattern image 210 displayed on the light valve, and FIG. 5B shows the shot correction pattern image 230. In FIG. 5A, the characteristic points $P_1, P_2, \ldots, P_n$ represent the characteristic points of the correction pattern image 210. Further, in FIG. 5B, the characteristic points $Q_1, Q_2, \ldots, Q_n$ indicate the characteristic points of the shot correction pattern image 230. The characteristic points $Q_1, Q_2, \ldots, Q_n$ correspond respectively to the characteristic points $P_1, P_2, \ldots, P_n$ of the correction pattern image 210. Further, as an example of ideal projection positions where the characteristic points $P_1, P_2, \ldots, P_n$ are displayed in the case in which no curved surface distortion is caused in the projection screen SC, the ideal projection position $p_2$ of the characteristic point $P_2$ is also shown in FIG. 5B. In the first embodiment, the position of each of the pixels composing the correction pattern image 210 displayed on the light valve 13 is represented with the two-dimensional XY coordination system, and the position of each of the pixels composing the shot correction pattern image 230 is represented with the two-dimensional xy coordination system. Hereinafter, when representing predetermined characteristic points, the characteristic points will be referred to as $P_i(X_i, Y_i)$, $Q_i(x_i, y_i)$ using the coordinates of the pixels representing the characteristic points. The variable i is an integer equal to or greater than one.

As shown in FIG. 5B, in the shot correction pattern image 230, the characteristic points $Q_1, Q_2, \ldots, Q_n$ are displayed so as to be shifted from the ideal projection positions due to the curved surface distortion of the projection screen SC. For example, the characteristic point $Q_2$ is displayed so as to be shifted upward from the ideal projection position $p_2$ of the characteristic point $P_2$. In order for displaying the characteristic points $Q_i$ at the respective ideal projection positions pi, it is enough to move the positions of the respective characteristic points $P_i$ of the correction pattern image 210 corresponding respectively to the characteristic points $Q_i$ in accordance with the calculated amounts of the distortion in the inverted directions of the directions of the distortion of the respective characteristic points $Q_i$, namely to the points $P_i'(X_i',Y_i')$.

The CPU 100 analyzes the shot correction pattern image 230 to detect the coordinates $(x_i, y_i)$ of the characteristic points $Q_i$, and calculates the distortion amounts representing which direction the respective characteristic points $Q_i$ are shifted from the ideal projection positions $p_i(a_i,b_i)$ of the characteristic points $P_i$ corresponding respectively to the characteristic points $Q_i$, and how long the shifted distances are. The amount of distortion can be calculated as the difference $(a_i-x_i, b_i-y_i)$ between the coordinates of the ideal projection positions $p_i$ and the respective characteristic points $Q_i$, for example. The CPU 100 generates the distortion correction information by collecting the distortion amounts of all of the characteristic points thus calculated into a table.

The CPU 100 executes the distortion correction process, which provides the distortion in the inverted direction of the distortion of the characteristic points, on the input image data using the distortion correction information thus generated (step S16), and displays the distortion image on the light valve 13 based on the correction image data on which the distortion correction process has been executed (step S18). It should be noted that when executing the distortion correction process, it is preferable that the distortion of the peripheral area of each of the characteristic points is also interpolated by, for example, executing approximation based on the distortion amounts of the characteristic points adjacent to each other in addition to providing the distortion to the place corresponding to each of the characteristic points. FIG. 6B shows, as an example, the distortion image displayed on the light valve 13 based on the correction image data on which the distortion correction process has been executed. As shown in FIG. 6B, the characteristic points $P_i$ of the distortion image 240 are moved to the points $P_i'(X_i',Y_i')$ in the inverted direction of the distortion of the characteristic points $Q_i$ of the shot correction pattern image 230 in accordance with the distortion correction information. As a result, the image without distortion is displayed on the projection screen SC.

According to the projector of the first embodiment explained above, the distortion of the projection image is detected using the correction pattern image having a plurality of characteristic points arranged at the densities varying in accordance the incident condition of the projection light. Therefore, it is possible to detect the distortion of the projection image with a smaller amount of calculation while maintaining the detection accuracy in comparison with the case of using the correction pattern image with the characteristic points arranged thickly at the same intervals. Therefore, it becomes possible to correct the distortion of the projection image with high accuracy, and thus displaying the image without distortion on the projection screen.

In the first embodiment, the distortion correction process is executed using the correction pattern image having the characteristic points arranged at a lower density in the direction along the incident direction of the projection light to the projection screen SC and at a higher density in the direction substantially perpendicular to the incident direction of the projection light to the projection screen SC. Therefore, the distortion of the region, which is thought to have large distortion, can be detected minutely. For example, although the projection image is distorted significantly in the vertical direction in the case in which the projection light enters the projection screen SC substantially upward from a position below the projection screen SC as in the first embodiment, by using the correction pattern image having the characteristic points arranged more thickly in the lateral direction than in the vertical direction as in the first embodiment, the distortion in the vertical direction can be detected with high accuracy.

Further, since the configuration (e.g., the configuration of the projection lens) of the optical system of the projector is determined in accordance with the positional relationship between the projector and the screen, the correction pattern image corresponding to the configuration of the optical system of the projector is determined. According to the projector of the first embodiment, since the correction pattern image corresponding to the design of the optical system of the projector has previously been stored, the trouble of acquiring the correction pattern image from another device or generating the correction pattern image can be avoided, thus improving the processing speed.

It is preferable to use the correction pattern image of the first embodiment in the case in which the projector is located with a relatively long distance from the projection screen SC.

B. Second Embodiment

In a second embodiment, the distortion correction process is executed using the correction pattern image having an arrangement with densities varying in accordance with the incident angle of the projection light. The projector 10 of the second embodiment is a short focus projector, and displays an image from a position below the projection screen SC and relatively near to the projection screen SC. It should be noted that in the second embodiment, the configuration of the projector and the flow of the distortion correction process are the same as in the first embodiment except the correction pattern image.

B1. Incident Angle and Correction Pattern Image

Figure 7:
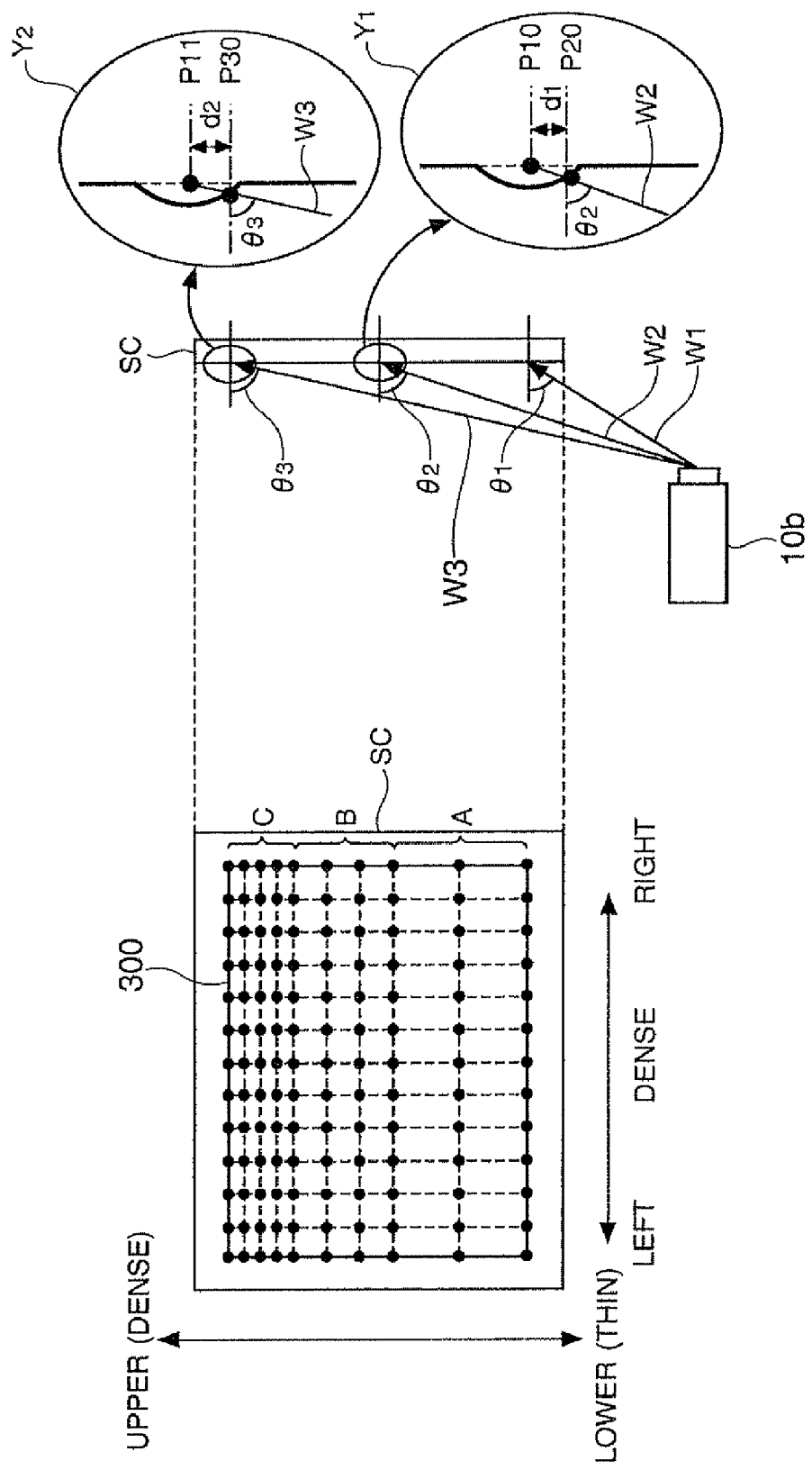
FIG. 7 is an explanatory diagram for exemplifying an incident angle of projection light and a correction pattern image 300 in a second embodiment.

FIG. 7 is an explanatory diagram for exemplifying the incident angle of the projection light and the correction pattern image 300 in the second embodiment. The relationships between the incident angles of the projection light W2, W3 and the amounts of distortion of the projection image are respectively shown in the circles $Y_1$, $Y_2$ shown in FIG. 7. In the second embodiment, the projector 10a projects the projection light from a position below the projection screen SC and with a predetermined distance from the projection screen SC. As shown in FIG. 7, the incident angle of the projection light W1 to the lower area A of the projection screen SC is $\theta_1$, the incident angle of the projection light W2 to the middle area B of the projection screen SC is $\theta_2$ ($\theta_2 > \theta_1$), and the incident angle of the projection light W3 to the upper area C of the projection screen SC is $\theta_3$ ($\theta_3 > \theta_2$). In other words, the nearer to the upper area C a position is, the larger the incident angle of the projection light at the position becomes.

The circle $Y_1$ shown in FIG. 7 shows an enlarged view of the middle area B of the projection screen SC where the projection light W2 enters with the incident angle $\theta_2$, and the circle $Y_2$ shows an enlarged view of the upper area of the projection screen SC where the projection light W3 enters with the incident angle $\theta_3$. The ideal projection position P10 is the position where the projection light W2 (incident angle $\theta_2$) enters in the case in which no distortion is caused in the projection screen SC, and the actual display position P20 is the position where the projection light W2 enters in the case in which distortion is caused in the projection screen SC. In the circle $Y_2$, the ideal projection position P11 is the position where the projection light W3 (incident angle $\theta_3$) enters in the case in which no distortion is caused in the projection screen SC, and the actual display position P30 is the position where the projection light W3 enters in the case in which distortion is caused in the projection screen SC. The distortion amount $d_2$ of the actual display position P30 of the projection light W3 with the large incident angle from the ideal projection position P10 is larger than the distortion amount $d_1$ of the display position of the projection light W2 from the ideal projection position P11. In other words, the larger the incident angle of the projection light is, the more significantly the projection image is distorted. Further, in the second embodiment, since the projection light enters the projection screen SC upward, as described in the first embodiment, the distortion becomes significant in the vertical direction of the projection screen SC.

The correction pattern image 300 has the characteristic points arranged so that the density thereof is high in the direction substantially perpendicular to the incident direction of the projection light to the screen, and increases as the incident angle of the projection light increases. Specifically, in the correction pattern image 300, there are disposed the characteristic points, which are arranged in the correction pattern image in the first embodiment, arranged so as to have a high density in a direction substantially perpendicular to the incident direction of the projection light. In addition, in the area to be projected on the upper area C of the projection screen SC, there are arranged the characteristic points thickly along the incident direction of the projection light. Further, in the area to be projected on the middle area B of the projection screen SC, there are arranged the characteristic points along the incident direction of the projection light at a density lower than the density in the area C, and higher than the density in the area where the projection light is projected on the lower area A of the projection area SC.

The projector 10a generates the distortion correction information using the correction pattern image 300 having the arrangement densities varying in accordance with the incident angle of the projection light as described above, and executes the distortion correction process on the image data thus obtained to display the input image on the projection screen SC.

According to the projector 10a of the second embodiment as explained, in the projection image, the larger the incident angle of the projection light to the projection screen SC is at a position, the more minutely the distortion at the point can be detected. In the second embodiment, since the projection light enters the projection screen SC upward from the position below the projection screen SC, the higher the position on the projection screen SC is, the more significant the distortion of the projection image becomes. Therefore, by using the correction pattern image 300 having the characteristic points arranged thickly in the direction substantially perpendicular to the projection light, and at the density increasing as the incident angle of the projection light to the projection screen SC grows, the distortion of the projection image can be detected with high accuracy. Therefore, the image without distortion can be displayed on the projection screen SC.

The correction pattern image shown in the second embodiment is preferably used particularly in the case in which the projector is disposed relatively near to the projection screen SC (e.g., the projection screen SC is located at the position closer to the projector than the projection screen SC in the first embodiment). Since in the case in which the projector is located relatively close to the projection screen SC, the incident angle significantly varies between the lower area and the upper area of the correction pattern image projected thereon, it is possible to detect the distortion of the projection image more accurately by increasing the density of the characteristic points arranged in the upper area where the incident angle becomes larger.

C. Third Embodiment

In a third embodiment, the distortion correction process is executed using the correction pattern image having an arrangement with a densities varying in accordance with the projection distance from the projector to a predetermined point of the projection screen SC. It should be noted that in the third embodiment, the configuration of the projector and the flow of the distortion correction process are the same as in the first embodiment except the correction pattern image. Further, the projection screen SC in the third embodiment has a lateral size larger than that of the projection screen SC in the first embodiment. Still further, the projector 10 of the third embodiment is a short focus projector, and displays an image from a position near to the projection screen SC.

C1. Projection Distance and Distortion of Projection Image

Figure 8:
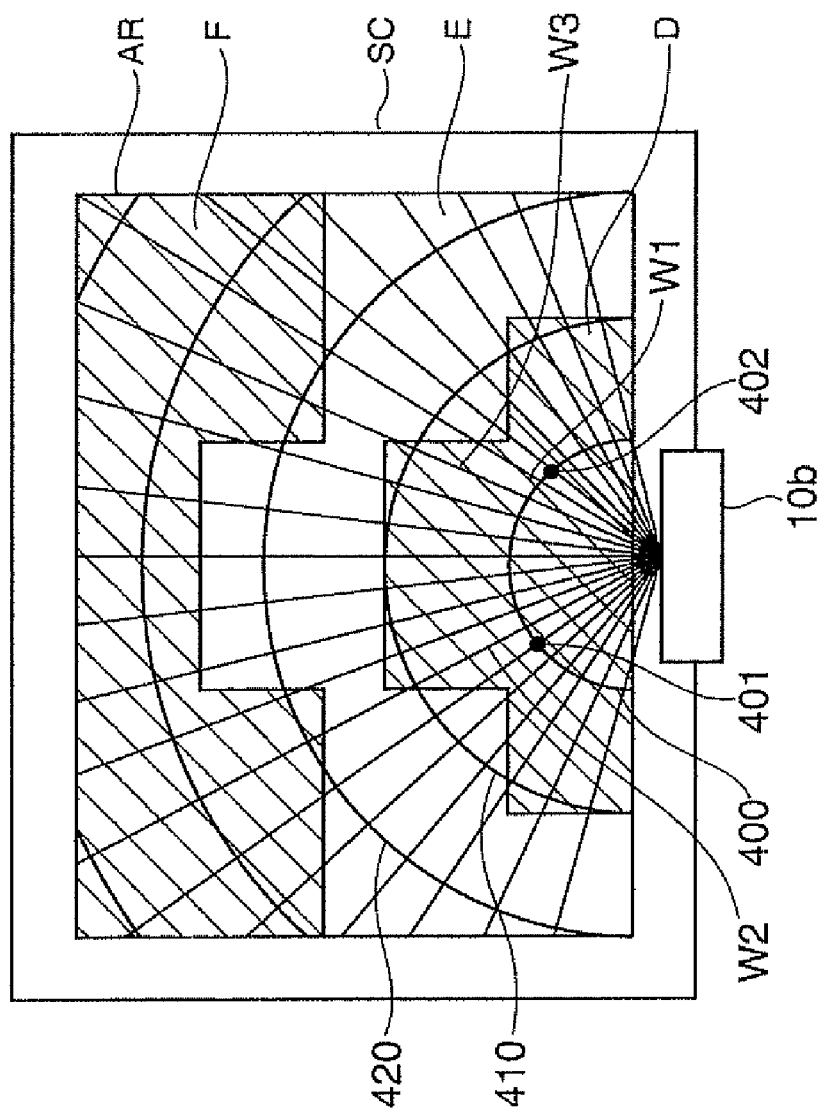
FIG. 8 is an explanatory diagram for explaining a projection distance of a projector 10b in a third embodiment.

FIG. 8 is an explanatory diagram for explaining the projection distance of the projector 10b according to the third embodiment. A display area AR shows an area on the projection screen SC, in which an image is displayed with the projection light. Each of projection distance lines 400, 410, 420, 430, and 440 represents the aggregate of points having the same projection distance of the projection light emitted from the projector 10b. For example, the points 401, 402 on the projection distance line 400 are the points having the same projection distance. The projection distance of the projection light is proportional to the incident angle of the projection light to the projection screen SC. As explained in the second embodiment, since the distortion of the projection image increases in accordance with the growth in the incident angle of the projection light, the distortion of the projection image increases as the projection distance becomes longer. For example, as shown in FIG. 8, when dividing the image display area AR into three areas in accordance with the projection distance, the distortion of the projection image becomes greater in the area C with a longer projection distance than in the area A with a shorter projection distance. In the third embodiment, there is used the correction pattern image with an arrangement densities of the characteristic points P varying in accordance with the difference in the projection distance.

C2. Correction Pattern Image

Figure 9:
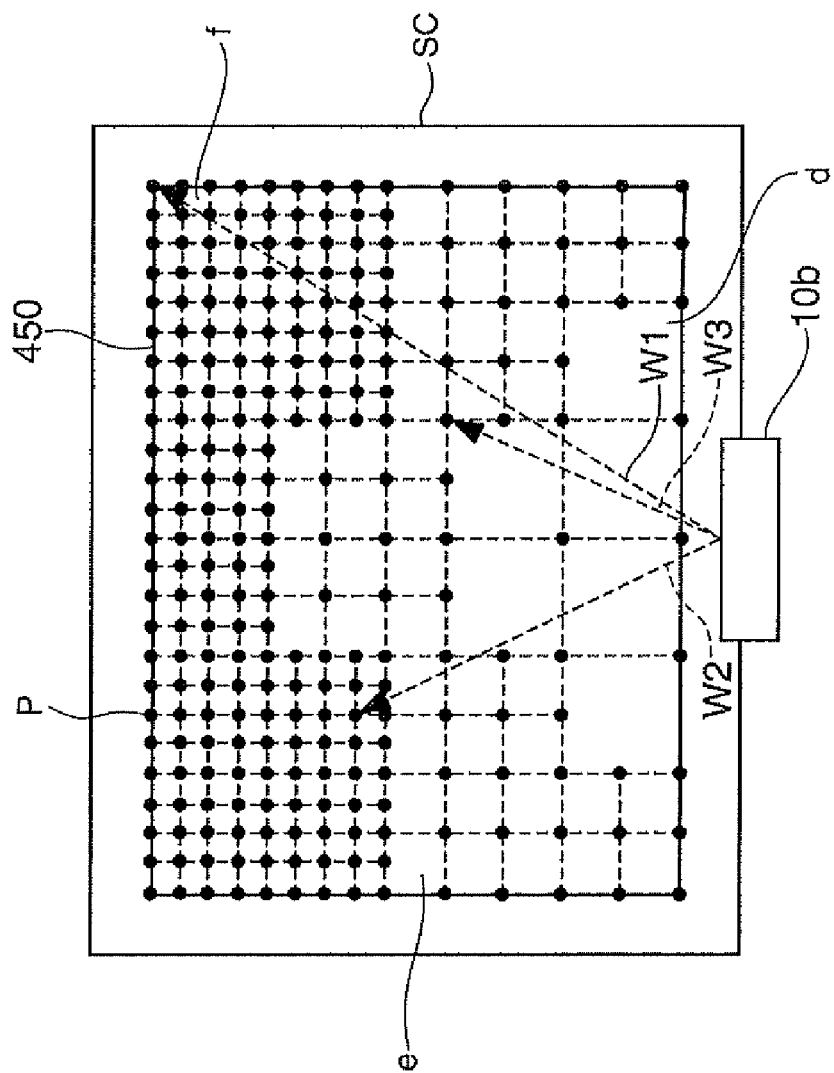
FIG. 9 is an explanatory diagram for exemplifying a correction pattern image 450 in the third embodiment.

FIG. 9 is an explanatory diagram for exemplifying the correction pattern image 450 in the third embodiment. The correction pattern image 450 has the characteristic points P arranged at different density between areas d, e, and f corresponding to the three areas D, E, and F obtained by dividing the image display area AR in accordance with the projection distance as shown in FIG. 8. Specifically, the correction pattern image 450 is provided with the characteristic points arranged so that the densities of the areas f, e, and d become high, middle, and low, respectively, in the descending order of the projection distance. In other words, the density of the characteristic points in the area f with the longest projection distance is the highest, and the density in the area d with the shortest projection distance is the lowest.

The projector 10b generates the distortion correction information using the correction pattern image having the arrangement densities varying in accordance with the projection distance as described above, and executes the distortion correction process on the input image data to display the input image on the projection screen SC.

According to the projector of the third embodiment explained hereinabove, the distortion correction is executed using the correction pattern image having the characteristic points arranged at the densities varying in accordance the projection distance of the projection light. Since the longer the projection distance of the projection light is, the larger the incident angle of the projection light becomes, the distortion of the projection image displayed at the position having the long projection distance of the projection light becomes large. Since the characteristic points are displayed in the area on the projection screen SC having the long projection distance of the projection light at a high density using the correction pattern image of the third embodiment, it becomes possible to detect the distortion of the projection image minutely, thus increasing the accuracy in the distortion correction.

The correction pattern image shown in the third embodiment is particularly suitable for the case in which the width of the projection screen SC is large, or the launch distance of the projection light from the projector 10b to the projection screen SC is short (e.g., the case in which the projector is located closer to the screen than in the case shown in FIGS. 3A and 3B). As described above, it is preferable to use the pattern corresponding to the positional relationship between the screen and the projector.

D. Fourth Embodiment

In the first through the third embodiments, the correction pattern image is previously stored in the storage device in the projector. In the fourth embodiment, the projector detects the tilt of the projector, and generates the correction pattern image in accordance with the tilt angle. It should be noted that in the fourth embodiment, the configuration of the projector and the flow of the distortion correction process are the same as in the first embodiment except that the distortion correction information generation section 104 is further provided with the function of generating the correction pattern image.

Figure 10:
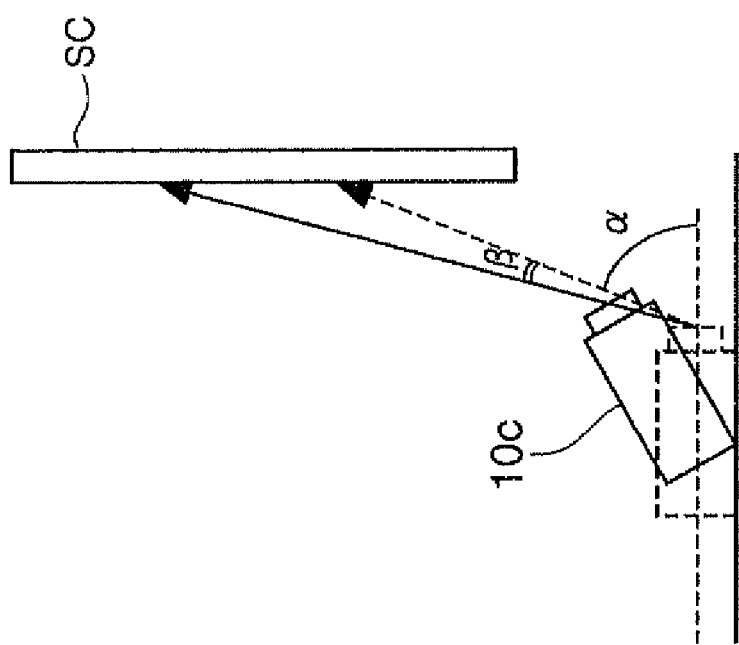
FIG. 10 is an explanatory diagram for explaining a tilt of a projector 10c in a fourth embodiment.

FIG. 10 is an explanatory diagram for explaining a tilt of a projector 10c in the fourth embodiment. The projector 10c has a projection lens designed so as to have the projection angle α in the condition in which the projector 10c is implemented on the horizontal plane. FIG. 10 shows the condition in which the projector 10c is tilted at an angle β by the user.

Figure 11:
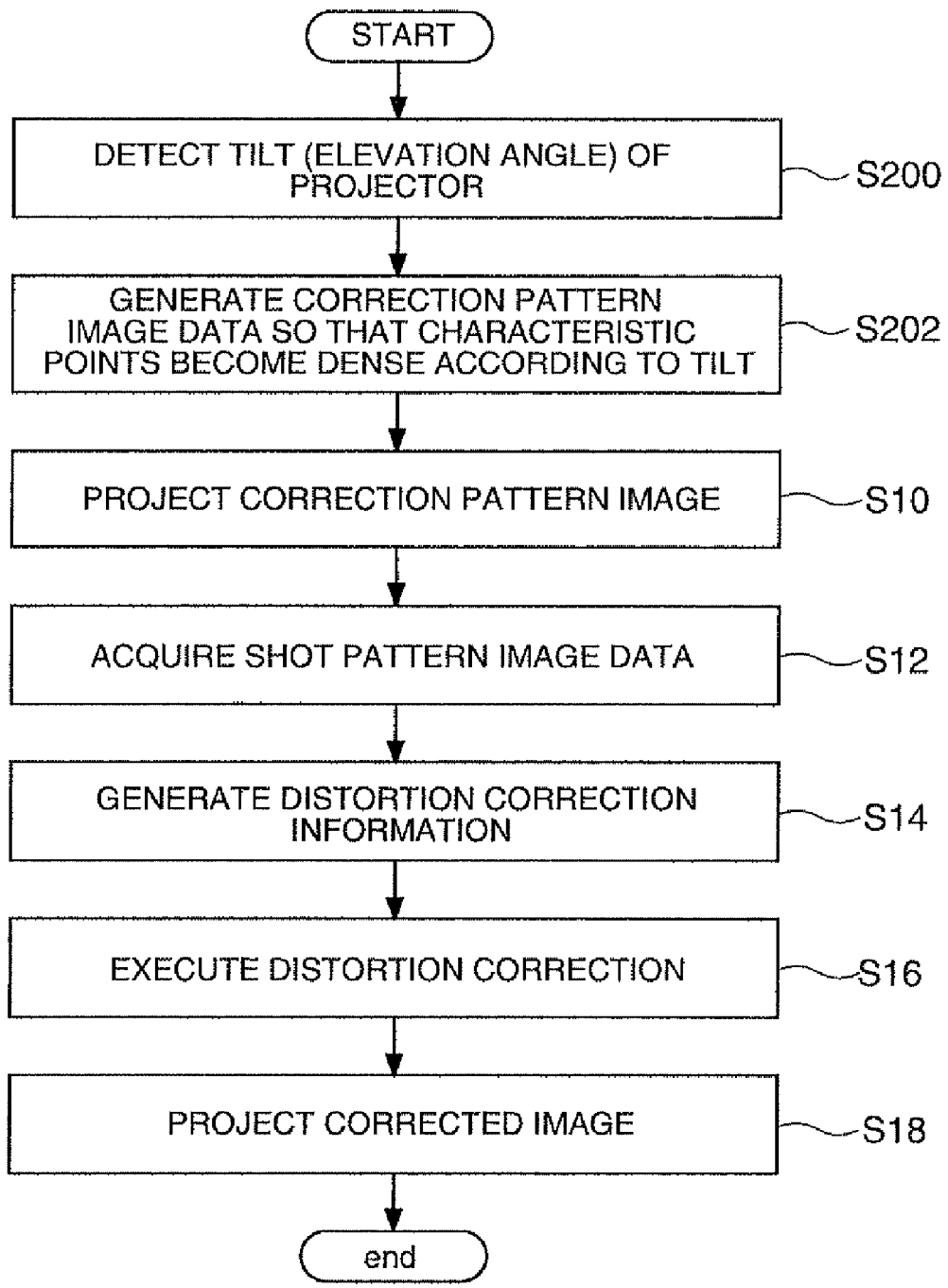
FIG. 11 is a flowchart for explaining a distortion correction process in the fourth embodiment.

FIG. 11 is a flowchart for explaining the distortion correction process in the fourth embodiment. The CPU 100 of the projector 10 detects the tilt angle β of the projector (step S200), and generates the correction image data so that the density of the characteristic points displayed on the upper part of the screen where the projection light enters with a large incident angle becomes high in accordance with the design projection angle α of the projection lens and the tilt angle β thereof (step S210). Then, the CPU 100 executes the distortion correction process using the correction image data thus generated (step S10 and the following steps in FIG. 4).

According to the projector 10c of the fourth embodiment as described hereinabove, since there is no need for previously preparing the correction image data, the capacity of the memory in the projector 10c can be saved. Further, since it is possible to generate appropriate correction image data for detecting the distortion of the projection image and detect the distortion even in the case in which the projector 10c is tilted, the image without distortion can be displayed on the projection screen SC. It should be noted that it is also possible to configure the projector so as to generate the correction image data suitable for the configuration of the projector even in the case in which the projector is not tilted.

E. Modified Examples

1. Although in the first embodiment, the projection light enters the projection screen SC substantially upward, and therefore, the characteristic points are arranged to have the higher density in the direction substantially perpendicular to the projection light, namely the horizontal direction of the projection screen SC, if the projection light enters the projection screen SC in the lateral direction, for example, it is possible to arrange the characteristic points so as to have a higher density in the direction substantially perpendicular to the projection light, namely the vertical direction of the projection screen SC. According to the configuration described above, even in the case in which the projector 10 cannot be disposed in front of the projection screen SC or the case in which the lens shift is executed, the distortion of the projection image can be detected minutely. Therefore, the distortion of the projection image can be corrected with high accuracy.

2. Although in the second embodiment, the densities of the characteristic points vary stepwise in accordance with the incident angle of the projection light, it is enough that with respect to the densities of the characteristic points arranged in at least two predetermined positions on the projection screen SC, the density of the characteristic points arranged in a position where the projection light enters at a first incident angle is set higher than the density of the characteristic points arranged in a position where the projection light enters at a second incident angle smaller than the first incident angle. It is possible, for example, to set the density of the characteristic points displayed in the position on the projection screen SC where the incident angle becomes the minimum to be a first density, and to set the density of the characteristic points displayed in the position on the projection screen SC where the incident angle becomes the maximum to be a second density. According to the configuration described above, the correction pattern image can easily be generated.

3. Although in the third embodiment, the correction pattern image 450 is configured so that the arrangement densities of the characteristic points vary in accordance with the projection distance of the projection light, it is also possible to configure the correction pattern image so that the characteristic points are arranged in the densities different between the areas formed by dividing the projection screen in accordance with the incident angle of the projection light to the projection screen SC in the case in which the projection light is launched to the projection screen SC from the position roughly right below the projection screen SC at close range as is the case with the projector 10b and the projection screen SC of the third embodiment. In this case, the pattern image becomes substantially the same as the correction pattern image 450. As described above, by appropriately preparing the pattern image suitable for the distortion detection of the projection image as the correction pattern image based on the configuration of the optical system of the projector, the installation positional relationship between the projection screen SC and the projector, and so on, the distortion correction accuracy of the projection image can be improved.

4. Although in the first through third embodiments, the correction pattern image is previously stored in the storage device in the projector, and in the fourth embodiment, the projector generates the correction pattern image, it is also possible, for example, to generate the correction image data corresponding to the incident conditions of the projection light to a predetermined position on the projection screen, or to acquire the correction image data suitable for the incident conditions of the projection light to a predetermined position on the projection screen from the storage section storing a plurality of types of correction image data. In this case, it is also possible to acquire the correction pattern image from, for example, other devices via a network or a portable storage device such as a memory card. It is possible that the user selects the appropriate correction pattern in accordance with the lens design of the projector, or the projector automatically acquires it in accordance with the lens design of the projector or the tilt of the optical axis of the projector. According to the configuration described above, it is possible to flexibly acquire the correction pattern image from various pattern images in accordance not only with the design values of the projector, but also with the use conditions thereof.

5. Although in the first embodiment, the shooting section 20 takes the projection image at the viewpoint position of the viewer, the shooting position is not limited to the viewpoint position of the viewer. For example, it is possible to incorporate the digital camera in the projector main body. In this case, it is possible to execute triangular surveying using the parallax component between the projection lens of the projector 10 and the shooting lens of the shooting section 20 to calculate the distortion of the projection screen SC, thereby generating the distortion correction information. According to the process described above, it becomes possible for the user to avoid the trouble of shooting the projection image with the digital camera. Further, when the user executes the shooting, the optical axis of the shooting section 20 is sometimes tilted to cause the keystone distortion in the shot image. According to the present modified example, since the shooting section 20 and the projection lens of the projector 10 have a predetermined positional relationship, it becomes possible to prevent the keystone distortion caused in the shot image when taking the image due to the hand tremor of the user. Therefore, the accuracy of distortion amount detection can be improved.

6. Although in the first through third embodiments, the shooting section 20 shoots the correction pattern image, and the CPU 100 of the projector 10 generates the distortion correction information using the shot image, it is also possible that the projector is provided with an input support section for making the user input the information related to the shift amount of the display positions of the characteristic points displayed in the correction image projected on the projection screen, and generates the distortion correction information based on the information related to the shift amount thus input, for example. In this case, it is also possible, for example, that the user moves each of the characteristic points of the correction pattern image displayed on the projection screen SC using a remote controller or the like, and the CPU 100 of the projector 10 generates the distortion correction information in accordance with the distance of the movement.

7. Although in the first through fourth embodiments, the distortion amount is calculated with respect to each of the characteristic points included in the correction pattern image, it is also possible, for example, to execute the distortion correction process using only a limited number of characteristic points out of all of the characteristic points included in the correction pattern image. In this case, it is possible, for example, to clip the area, which is thought to include the distortion caused according to the visual observation by the user, and generate the distortion correction information using the characteristic points included in the clipped area. Further, it is also possible to generate the distortion correction information using the characteristic points included in the predetermined area. According to the process described above, when executing the distortion correction process on the image data representing the image to be projected, since it is enough to execute the distortion correction process only on the image data corresponding to the partial area, the process load can be reduced compared to the case in which the distortion correction process is executed on the entire image data.

8. Although in the first through fourth embodiments, the entire projection correction pattern image displayed on the projection screen is shot, and the distortion correction process is executed using the shot image, it is also possible, for example, to shoot only a partial area out of the projection correction pattern image, and to execute the distortion correction process using the image of the partial area. In this case, it is also possible to shoot the area, which is though to include the distortion caused according to the visual observation by the user. According to the process described above, it becomes possible to reduce the process load and to shorten the correction time compared to the case of calculating the distortion amount of each of the characteristic points included in the correction pattern image.

9. Although in the first through fourth embodiments, the characteristic points are represented with dots, any figures besides the dots or characters can also be used. For example, it is possible to use a predetermined character string instead of the characteristic points, and to increase the density of the character string displayed in the position with the larger incident angle. Further, it is also possible to display a character string or a texture overlapping the characteristic points.

Hereinabove, various embodiments of the invention are described. The invention is not limited to these embodiments, but can take various configurations within the scope of the invention.

The entire disclosure of Japanese Paten Application No. 2008-038546, filed Feb. 20, 2008 is expressly incorporated by reference herein.

What is claimed is:

1. An image processing device adapted to correct distortion of an image projected on a projection screen with projection light emitted from a projector, comprising:
   a detection section adapted to detect at least one of display positions of a plurality of predetermined figures displayed in a correction image projected by the projector on the projection screen, the plurality of figures arranged at densities varying in accordance with an incident condition of projection light to the projection screen;
   a distortion correction information generation section adapted to generate distortion correction information used for distortion correction of an image to be projected on the projection screen, the distortion correction information being based on variance in the detected display position of the plurality of predetermined figures caused by non-uniformity of a projection surface of the projection screen when the projection light is projected on the projection surface at an incident angle, and correction image data representing the correction image;
   an acquisition section adapted to acquire image data representing the image to be projected on the projection screen; and
   a distortion correction section adapted to execute a distortion correction process using the distortion correction information on the image data acquired,
   wherein the plurality of predetermined figures projected on the projection screen is arranged at densities varying in accordance with the incident angle of the projection light to the projection screen, and is arranged to have a higher density in accordance with a larger incident angle of the projection light to the projection screen.

2. The image processing device according to claim 1, wherein
the plurality of predetermined figures projected on the projection screen is arranged at densities varying in accordance with an incident direction of the projection light to the projection screen.

3. The image processing device according to claim 2, wherein
the plurality of predetermined figures projected on the projection screen is arranged at densities different between areas obtained by dividing in accordance with the incident direction of the projection light to the projection screen.

4. The image processing device according to claim 2, wherein
the plurality of predetermined figures projected on the projection screen is arranged at a higher density in a direction substantially perpendicular to the incident direction of the projection light to the projection screen than a density in a direction substantially parallel to the incident direction.

5. The image processing device according to claim 1, wherein
the predetermined figures in the correction image are arranged at densities varying in accordance with projection distances of the projection light from the projector to the projection screen.

6. The image processing device according to claim 1, further comprising:
a shot correction image data acquisition section adapted to acquire shot correction image data representing the projection correction image shot by a shooting section; and
a correction image data acquisition section adapted to acquire correction image data representing the correction image,
wherein the distortion correction information generation section compares the shot image represented by the shot correction image data and the correction image with each other, and generates the distortion correction information based on the difference in the projection positions of the predetermined figures.

7. The image processing device according to claim 1, further comprising:
a storage section adapted to previously store the correction image data corresponding to a configuration of an optical system of the projector.

8. A projector comprising:
a light source;
an image formation section adapted to modulate light emitted from the light source based on image data to form an image represented by the image data;
a projection optical system adapted to project light representing the image formed by the image formation section on the projection screen; and
the processing device according to claim 1.

9. The image processing device according to claim 1, wherein
the plurality of predetermined figures projected on the projection screen is arranged at a constant density in a direction substantially perpendicular to an incident direction of the projection light to the projection screen.

10. A distortion correction method comprising:
detecting at least one of display positions of a plurality of predetermined figures displayed in a correction image projected by a projector on a projection screen, the plurality of figures arranged at densities varying in accordance with an incident angle of projection light to the projection screen, and is arranged to have a higher density in accordance with a larger incident angle of the projection light to the projection screen;
generating distortion correction information used for distortion correction of an image to be projected on the projection screen, based on variance in the detected display position of the plurality of predetermined figures caused by non-uniformity of a projection surface of the projection screen when the projection light is projected on the projection surface at the incident angle, and correction image data representing the correction image;
acquiring image data representing the image to be projected on the projection screen; and
executing a distortion correction process using the distortion correction information on the image data acquired.

* * * * *